(12) United States Patent
Reichert

(10) Patent No.: US 6,402,607 B2
(45) Date of Patent: Jun. 11, 2002

(54) FINE-MACHINING TOOL FOR MACHINING GEAR WORKPIECES

(75) Inventor: Gerhard Reichert, Maisach (DE)

(73) Assignee: The Gleason Works, Rochester, NY (US)

( * ) Notice: Subject to any disclaimer, the term of this patent is extended or adjusted under 35 U.S.C. 154(b) by 0 days.

(21) Appl. No.: 09/739,954

(22) Filed: Dec. 18, 2000

(30) Foreign Application Priority Data

Dec. 29, 1999 (DE) ...................................... 299 22 958 U

(51) Int. Cl.$^7$ ................................................. B23F 21/03

(52) U.S. Cl. ........................ 451/541; 451/544; 451/546

(58) Field of Search ................................ 451/540, 541, 451/544, 546

(56) References Cited

U.S. PATENT DOCUMENTS

| | | | | |
|---|---|---|---|---|
| 1,403,416 A | * | 1/1922 | Katzenstein |
| 2,006,308 A | * | 6/1935 | Bush et al. |
| 2,027,132 A | * | 1/1936 | Webster |
| 2,479,079 A | * | 8/1949 | Reid, Jr. |
| 2,763,105 A | * | 9/1956 | Feeley |
| 3,030,743 A | * | 4/1962 | Raymond |
| 3,067,551 A | * | 12/1962 | Maginnis |
| 3,802,130 A | * | 4/1974 | Lindenbeck |

* cited by examiner

Primary Examiner—Eileen P. Morgan
(74) Attorney, Agent, or Firm—Robert L. McDowell

(57) ABSTRACT

A fine-machining tool, a honing wheel in particular, characterized by an axial laminar structure with a center layer and two exterior layers bonded to each other, the center layer consisting of a plastic material in which cutting grains are embedded, and the outer layers engaged with the two edge areas of the workpiece consisting of ceramically bonded cutting grains.

8 Claims, 1 Drawing Sheet

FINE-MACHINING TOOL FOR MACHINING GEAR WORKPIECES

FIELD OF THE INVENTION

The invention relates to a fine-machining tool, a honing wheel in particular, for machining gear workpieces.

BACKGROUND OF THE INVENTION

A fine-machining tool such as this, which may be internally geared or externally geared, has a plurality of nondefined cutting edges which are made up of individual cutting grains. These cutting grains may be either ceramic-bonded or resin-bonded. Hence reference is made to a cutting grain in ceramic bonding or cutting grain in plastic bonding. Embedding of fragments of ceramically bonded cutting elements in a plastic material is also now state of the art. Fine-machining tools with ceramic bonding are characterized by good cutting performance and stability of shape but are relatively brittle and thus fracture-prone and impact-sensitive.

Fine-machining tools with plastic bonding, on the other hand, have the advantage of greater elasticity over such tools with ceramic bonding, for which reason they are not as fracture-prone and impact-sensitive. In contrast to this advantage, the cutting performance of such tools is much lower.

The invention is based on the problem of creating a fine-machining tool, a honing wheel in particular, which exhibits adequate elasticity despite high cutting performance.

SUMMARY OF THE INVENTION

It is claimed for the invention that a fine-machining tool meeting this requirement, a honing wheel in particular, characterized by an axial laminar structure with a center layer and two exterior layers bonded to each other, the center layer consisting of a plastic material in which cutting grains are embedded, and that the outer layers engaged with the two edge areas of the workpiece consist of ceramically bonded cutting grains.

As a result of the laminar structure of the fine-machining tool claimed for the invention, the advantageous properties of the ceramic bonding, that is cutting force, cutting performance, and guiding function, are not only combined but also reinforce each other. The invention makes use of the finding that the required removal of material is significantly more extensive in the edge area of the gear to be machined than in the center area of the latter, as is explained in detail below. For this reason the layers of higher cutting performance are mounted in the external areas of the fine-machining tool claimed for the invention, while the layer of lower cutting performance but of higher elasticity and better guiding function is mounted in the center area. Experiments have shown that a honing wheel with a structure as claimed for the invention has a tool life several times longer than that of a honing wheel with pure plastic bonding. The fine-machining tool claimed for the invention is especially well suited for machining of workpieces with extensive premachining variations and aggressive flank surfaces. It is also to be used for removal of large amounts of material and for workpieces with burred tooth flanks. The tool claimed for the invention also yields good results if machining of a workpiece must be carried out with a relatively small axis intersection angle. The cutting conditions are more difficult for these workpieces and are improved by use of the ceramic material.

The stable edge areas of the tool characterized by high nondeformability are also of particular advantage in machining of workpieces having an irregular outline (for example, a so-called shoulderwork). Because of this irregular outline, the tool may project only a slight distance above the workpiece, so that the danger exists that the tool will be deformed in this edge area when subjected to the contact pressure.

The thickness of the center layer is approximately 20 to 90 percent of the total thickness of the fine-machining tool claimed for the invention.

The two outer layers are preferably bonded to the center layer by adhesion.

Fragments of ceramically bonded cutting elements may additionally be embedded in the center layer to increase the cutting performance.

An embodiment of the invention is shown in the drawings and discussed in detail below.

DETAILED DESCRIPTION OF THE INVENTION

Figure 1:
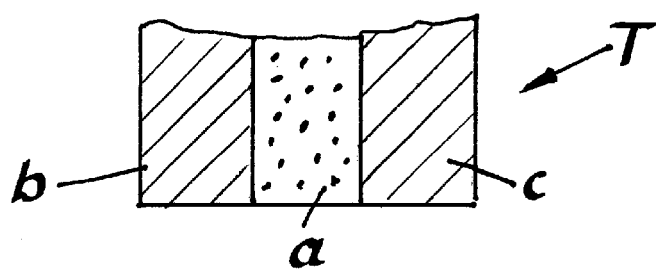
FIG. 1 presents an axial section through a partial area of a fine-machining tool.

The fine-machining tool T shown in FIG. 1, a honing wheel for example, has an axial laminar structure with a center layer a and two outer layers b and c which are glued together. The center layer consists of a plastic material in which cutting grains are embodied. In addition, fragments of ceramically bonded cutting elements may be embedded. The two outer layers b and c of the tool T consist of a ceramic material. In the exemplary embodiment shown the three layers a, b, and c are of the same thickness. This is not absolutely necessary, however. The thickness of the center layer a may amount to 20 to 90 percent of the total thickness of the tool T.

Figure 2:
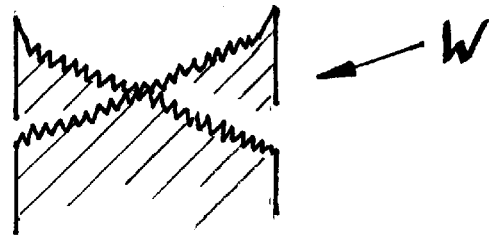
FIG. 2 illustrates variations of flank line diagrams inside a gear workpiece.

As is to be seen from the helix line diagram in FIG. 2, the tooth flanks of the gear workpiece W to be machined are not parallel but rather are inclined at different angles to the axis of rotation. The primary cause of this phenomenon is represented by variation in pitch and in concentric running. If the bore of the workpiece W does not extend precisely at a right angle to its frontal areas, rotation of the workpiece clamped in the machine tool results in wobbling. Such wobbling leads to inclination of the teeth flanks to the axis of rotation, the maximum values of positive and negative inclination of the tooth flanks being shifted in relation to rotation through 1800. In addition, especially hard tips, such as residual burrs, may be formed on the ends of each tooth during hardening of the workpiece. Similarly, the edge areas of the tooth flanks frequently suffer mechanical damage exerting a negative effect on tool life.

Figure 3:
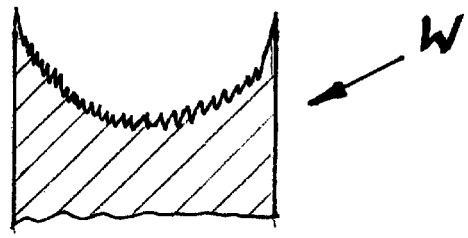
FIG. 3 illustrates the aggregate of all flanks on the periphery of the workpiece.

FIG. 3 shows the aggregate of all flanks on the periphery of the workpiece W; to some extent the envelope generating curve of all tooth flanks is involved. As is to be seen from this illustration, significantly more material must be removed in the edge areas of the workpiece than in the central area.

The different inclination of the teeth flanks in FIG. 2 and the curvature of the envelope curve in FIG. 3 are greatly exaggerated for the purpose of greater clarity of illustration.

Figure 4:
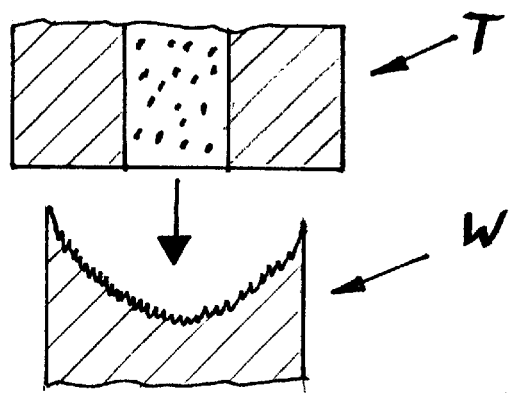
FIG. 4 shows a diagram of the tool and the workpiece in the plunge-cut phase.
Figure 5:
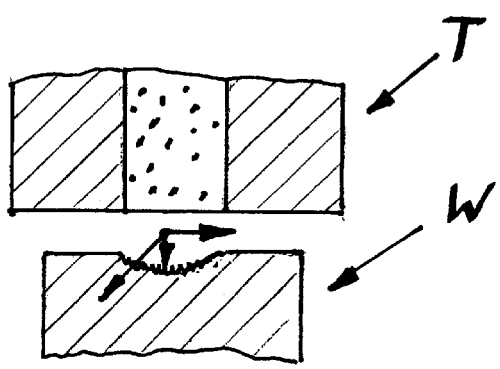
FIG. 5 illustrates a representation similar to that in FIG. 4 at the end of the plunge-cut phase.

As is shown in FIG. 4, the laminar structure selected for the tool T is such that the two outer layers b and c engage the two edge areas of the workpiece when the tool T is fed radially. In the so-called plunge-cut phase, in which radial feed only of the tool T takes place, preferably the two edge areas of the workpiece W are machined by the outer layers b and c. If the plunge-cut phase has ended, a more or less even amount of metal is removed from the tooth flanks, as is shown in FIG. 5. This phase may now be followed by fine-machining, in which the more elastic center layer a of the tool T machines the central area of the workpiece 2. The movements of the tool T are indicated by arrows in the drawing.

In machining of a workpiece W predominantly the center layer a of the fine-machining tool T assumes the guiding function, while the two outer layers b and c assume the essential cutting function. The fine-machining tool illustrated is well suited especially for workpieces presenting a difficult machining problem such as removal of a large amount of metal, wide gear geometry variations, large gear cutting widths, wobbly flank lines, small axis intersection angle γ, small machining strokes, and the like.

While the invention has been described with reference to preferred embodiments it is to be understood that the invention is not limited to the particulars thereof. The present invention is intended to include modifications which would be apparent to those skilled in the art to which the subject matter pertains without deviating from the spirit and scope of the appended claims.

What is claimed is:

1. A fine-machining tool for machining teeth of gear workpieces, said tool comprising:
    an axial layered structure with a central and two outer layers (a, b, c) which are bonded to each other, the central layer (a) consisting of a plastic material in which cutting grains are embedded, and the outer layers (b and c) consisting of ceramically bonded cutting grains,
    whereby upon machining, said outer layers (b, c) come into contact with edge areas of the workpiece teeth.

2. A fine-machining tool as described in claim 1 wherein the thickness of the center layer (a) represents 20 to 90 percent of the total thickness of the tool (T).

3. A fine-machining tool as described in claim 1 wherein the two outer layers (b and c) are bonded to the center layer (a) by adhesion.

4. A fine-machining tool as described in claim 2 wherein the two outer layers (b and c) are bonded to the center layer (a) by adhesion.

5. A fine-machining tool as described in claim 1 wherein fragments of ceramically bonded cutting elements are additionally embedded in the center layer (a).

6. A fine-machining tool as described in claim 2 wherein fragments of ceramically bonded cutting elements are additionally embedded in the center layer (a).

7. A fine-machining tool as described in claim 3 wherein fragments of ceramically bonded cutting elements are additionally embedded in the center layer (a).

8. The fine-machining tool of claim 1 comprising a honing wheel.

* * * * *